(12) United States Patent
Isik-Uppenkamp et al.

(10) Patent No.: US 11,067,418 B2
(45) Date of Patent: Jul. 20, 2021

(54) MAGNETICALLY INDUCTIVE FLOWMETER FOR SUPPRESSING NOISE

(71) Applicant: Siemens Aktiengesellschaft, Munich (DE)

(72) Inventors: Sonnur Isik-Uppenkamp, Harrislee (DE); Niels Per Mondrup, Haguenau (FR)

(73) Assignee: Siemens Aktiengesellschaft, Munich (DE)

( * ) Notice: Subject to any disclaimer, the term of this patent is extended or adjusted under 35 U.S.C. 154(b) by 275 days.

(21) Appl. No.: 16/312,807

(22) PCT Filed: Jun. 28, 2017

(86) PCT No.: PCT/EP2017/065991
§ 371 (c)(1),
(2) Date: Dec. 21, 2018

(87) PCT Pub. No.: WO2018/002135
PCT Pub. Date: Jan. 4, 2018

(65) Prior Publication Data
US 2020/0166392 A1 May 28, 2020

(30) Foreign Application Priority Data

Jun. 28, 2016 (DE) ..................... 10 2016 211 577.4

(51) Int. Cl.
*G01F 1/58* (2006.01)
*G01F 1/60* (2006.01)
(52) U.S. Cl.
CPC .............. *G01F 1/584* (2013.01); *G01F 1/586* (2013.01); *G01F 1/60* (2013.01)
(58) Field of Classification Search
None
See application file for complete search history.

(56) References Cited

U.S. PATENT DOCUMENTS

| 4,010,644 A | 3/1977 | Bonfig et al. |
| 4,036,052 A | 7/1977 | Levy |

(Continued)

FOREIGN PATENT DOCUMENTS

| CN | 101221057 | 7/2008 |
| CN | 103743443 | 4/2014 |

(Continued)

OTHER PUBLICATIONS

PCT International Search Report based on PCT/EP2017/065991 dated Sep. 22, 2017.

*Primary Examiner* — Harshad R Patel
(74) *Attorney, Agent, or Firm* — Cozen O'Connor

(57) ABSTRACT

A magnetically inductive flowmeter includes an electrode arrangement for capturing a voltage dependent on a medium flow speed and induced, over a measurement section, in a galvanically contacting manner, wherein signal processing is performed in a control and evaluation device to suppress noise, during which a first voltage signal between a first electrode and a reference potential and a second voltage signal between a second electrode and the reference potential are each captured and filtered to obtain a noise signal contained therein, where the first and second voltage signals are summed with the first and second noise signals, respectively, so as to form two sum signals in which their difference corresponds to the voltage induced over the measurement section, such that noise components caused, for example, by gas bubbles in the medium or electrochemical effects can be largely eliminated from the measurement signal.

6 Claims, 1 Drawing Sheet

(56) References Cited

U.S. PATENT DOCUMENTS

| | | | |
|---|---|---|---|
| 4,644,799 A | 2/1987 | Tomita | |
| 5,388,465 A | 2/1995 | Okaniwa et al. | |
| 6,392,416 B1 | 5/2002 | Keech | |
| 6,920,799 B1 | 7/2005 | Schulz | |
| 2007/0035309 A1* | 2/2007 | Keese | G01F 1/60 324/612 |
| 2008/0250866 A1* | 10/2008 | Tschabold | G01F 1/60 73/861.11 |
| 2010/0192700 A1 | 8/2010 | Iijima | |
| 2010/0231294 A1* | 9/2010 | Bier | G01F 1/60 330/69 |
| 2011/0239778 A1 | 10/2011 | Mitsutake et al. | |
| 2013/0238259 A1 | 9/2013 | Ddoley et al. | |
| 2015/0177035 A1* | 6/2015 | Rovner | G01F 25/0007 73/861.12 |
| 2016/0231152 A1* | 8/2016 | Pizzuti | G01F 1/60 |
| 2019/0156600 A1* | 5/2019 | Potyrailo | B61C 17/08 |

FOREIGN PATENT DOCUMENTS

| | | |
|---|---|---|
| CN | 104061969 | 9/2014 |
| DE | 2410407 | 9/1975 |
| DE | 102007053222 | 5/2009 |
| EP | 1042651 | 4/2002 |
| GB | 2333161 B | 6/2002 |
| WO | WO 2005/106400 | 11/2005 |
| WO | WO 2018/002135 | 1/2018 |

* cited by examiner

MAGNETICALLY INDUCTIVE FLOWMETER FOR SUPPRESSING NOISE

CROSS-REFERENCE TO RELATED APPLICATIONS

This is a U.S. national stage of application No. PCT/EP2017/065991 filed Jun. 28, 2017. Priority is claimed on German Application No. 102016211577.4 filed Jun. 28, 2016, the content of which is incorporated herein by reference in its entirety.

BACKGROUND OF THE INVENTION

1. Field of the Invention

The invention relates to a magnetically inductive flowmeter having a measurement section, through which a medium flows, which includes a device for creating a magnetic field of alternating polarity, an electrode arrangement, and a control and evaluation device.

2. Description of the Prior Art

Magnetically inductive flowmeters use Faraday's law of induction to determine the flow speed of a fluid flowing through them. A magnetic field at right angles to the direction of flow is created. In this magnetic field, because of charges that are transported with the fluid, a voltage arises at right angles to the magnetic field and to the direction of flow, which can be measured with the aid of electrodes. The measurement voltage established in this way along the measurement section is proportional to a speed of flow determined over the flow cross-section.

For capturing the induced voltage with electrodes, a certain conductivity of the medium is required, especially when the electrodes are contacting the medium in a galvanic manner. Moreover, the medium should possess a good homogeneity, so that the measurement section, via which the induced voltage is captured with the two electrodes, does not include any electrically non-conducting gas bubbles, solid matter particles or drops of liquid. In a disadvantageous manner, these types of inclusions of electrically non-conducting materials particularly lead to a noisy signal in the detection of the induced voltage, and thus to a deterioration of the measurement accuracy, in particular when the inclusions are located close to the electrodes.

A further cause of noisy signals in the measurement signal are fluctuations of the electrode potential as a result of electrochemical effects. The conductive medium and the electrode that contacts the medium form an electrochemical cell. In this cell an electrode potential arises, which is defined in general by the electromotive force that an electrode or electrochemical cell delivers. When two identical metal electrodes are arranged opposite one another in the same electrolyte, in the ideal case, the potential difference between the two electrodes is equal to zero. However, deviations from this ideal case, such as different surface quality of the electrodes, differences in surface contamination of the electrode surfaces, inhomogeneous distribution of the electrolyte concentration or of its ph value, pitting, roughness or corrosion of the electrode surfaces, formation of deposits or short-duration bubble formation on the electrodes, can lead to permanent or short-term differences in potential arising between the electrodes, which falsify the measurement signal of the magnetically inductive flowmeter. A few of these causes can even bring about marked voltage peaks in the measurement signal tapped off at the electrodes.

There are various approaches to solutions for reducing the noise signal caused by electrochemical reactions contained in the measurement signal. Even polishing the electrode surface to reduce the roughness and increase the surface hardness, by forming a homogeneous oxide layer on the surface, for example, through which the occurrence of the inclusion of materials on the surface is also reduced, can lead to a more stable and less noise-prone measurement signal.

Any scale deposits or inhomogeneous speed distributions in the flowing medium that might arise during long-term operation in the operation of the flowmeter are further causes of noise signals arising. Surface treatment measures of electrodes can therefore not be seen as sufficient on their own.

U.S. Pat. No. 4,644,799 discloses a magnetically inductive flowmeter in which, in order to rectify low-frequency noise signals, the measurement signal tapped off at the electrodes is delayed by a whole-number multiple of a half period, which corresponds to the frequency of the polarity change of the magnetic field. For further processing, the difference between the measurement signal delayed in this way and the non-delayed measurement signal is established. Higher-frequency noise signals continue to act in a disadvantageous way on the measurement result, however.

SUMMARY OF THE INVENTION

In view of the foregoing, it is an object of the invention is to provide a magnetically inductive flowmeter with improved insensitivity with regard to noise.

This and other objects and advantages are achieved in accordance with the invention by a magnetically inductive flowmeter in which both low-frequency and also high-frequency signal components in the measurement signal, which have the causes described above, are effectively and advantageously suppressed as a result of the innovative signal processing even in long-term operation of the magnetically inductive flowmeter. In particular, the noise signal suppression is much more effective than the conventional above-described methods for gas bubbles in the area of the electrodes, inhomogeneous distribution of the flow speed of the medium or fluctuations of the electrolyte concentration, which can lead to voltage peaks in the measurement signal. The described advantages can be achieved solely by changes that are made to the signal processing. As a result, no additional components are advantageously required compared to conventional flowmeters. Without appreciably increasing the costs of production, a magnetically inductive flowmeter with lower sensitivity to noise of the measurement signal and, thus, improved measurement accuracy can be obtained.

Moreover, the extraction of the respective noise signal from each of the two voltage signals, which is detected between a measurement electrode and the reference potential, allows a diagnosis of the state of the flowmeter in an especially simple way based on a threshold value comparison. The diagnostic information that can be obtained in this way relates, for example, to the presence of gas bubbles in fluids, to fluctuations in the electrical conductivity of the mediums, to ph value fluctuations and/or to the fill state of the measurement tube. The diagnostic information obtained can be passed on, for example, via a communications interface to a higher-ranking control station in a process technology system. If an error state is displayed via the diagnostic information, then maintenance measures that might possibly be required for avoiding errors or rectifying errors can be initiated.

In accordance with an especially advantageous embodiment of the invention, in order to capture the reference potential, which is used to determine the electrode potentials of the two measurement electrodes, a reference electrode is provided, which preferably consists of the same material as the two measurement electrodes and likewise contacts the medium to be measured in a galvanic manner. The reference potential electrode can be arranged on or in the wall of a measuring tube, in its circumferential area between the two electrodes. Here, the three electrodes used for the measurement are all subjected to the same flow conditions and electrochemical influences. As a result of the inventive capturing of the potential differences, the proportion of the noise signal in the two voltage signals can already be kept low when capturing the signals.

For extraction of the noise signal from the two captured voltage signals, a notch filter can be used in a simple way, of which the blocking frequency is tuned to the frequency of the polarity change of the magnetic field. The frequency components of the usable signal, which corresponds to the voltage induced in the medium flowing over the measurement section, i.e., lies in a narrow range around the frequency of the magnetic field or of its multiples and can therefore be filtered out effectively with one or more notch filters with blocking frequency tuned thereto in each case.

Notch filters and also filters in general can cause a certain delay between the filtered signal output and the unfiltered input signal. A further improvement in the noise suppression can therefore be achieved by the first voltage signal, before its summation with the second noise signal, as well as the second voltage signal, before its summation with the first noise signal, likewise being delayed to compensate for the respective signal delay arising during their filtering. This embodiment of the invention is able to be realized with a low outlay when digital filters and digital signal processing are used.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention, as well as its embodiments and advantages, will be explained in greater detail below with reference to the drawings, where an exemplary embodiment of the invention is shown, in which.

DETAILED DESCRIPTION OF THE EXEMPLARY EMBODIMENTS

Figure 1:
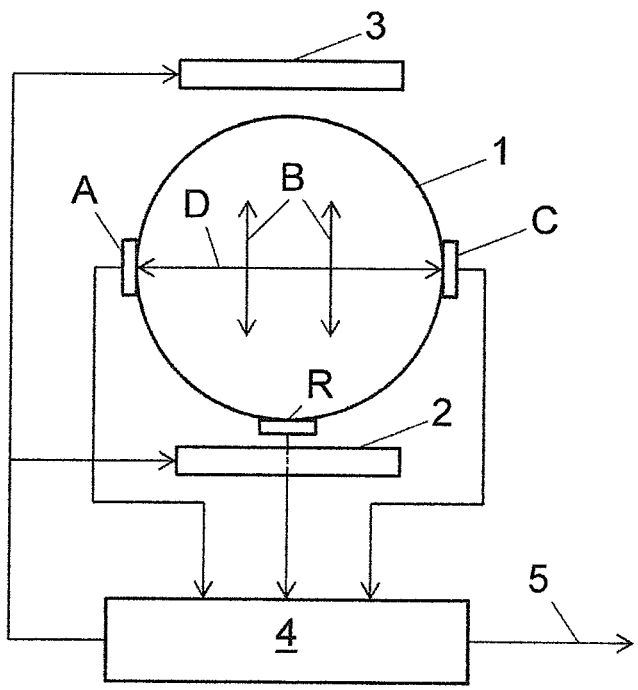
FIG. 1 is a schematic block diagram illustrating a magnetically inductive flowmeter in accordance with the invention.

In accordance with FIG. 1, a magnetically inductive flowmeter has a measurement tube 1, which extends at right angles to the plane of the drawing and through which a medium flows, of which the volume flow is to be detected. With magnetic coils 2 and 3, which are attached to outer sides of the measurement tube 1, a magnetic field B of alternating polarity is created in the inside of the tube and thus in the flow medium, by virtue of a direct current of alternating polarity being fed into the coils 2 and 3, for example. Arranged on both sides of a measurement section D are measurement electrodes A and C and on the floor of the measurement tube 1, for example, there is a reference electrode R, which serves as a reference potential electrode. The measurement electrodes A and C delimit the measurement section D, of which the length corresponds in the exemplary illustrated embodiment to the diameter of the measurement tube 1. When the medium is flowing, because of the magnetic field B, a voltage is induced in measurement section D, which is determined via the electrode arrangement, which comprises the measurement electrodes A and C and also the reference potential electrode R, and a control and evaluation device 4. The control and evaluation device 4 thus establishes the voltage induced over the measurement section D, calculates from this a measurement value for the flow and establishes diagnostic information about the state of the flowmeter. The results obtained can be passed on via a communications interface 5 to a higher-ranking control station in a process technology system.

Figure 2:
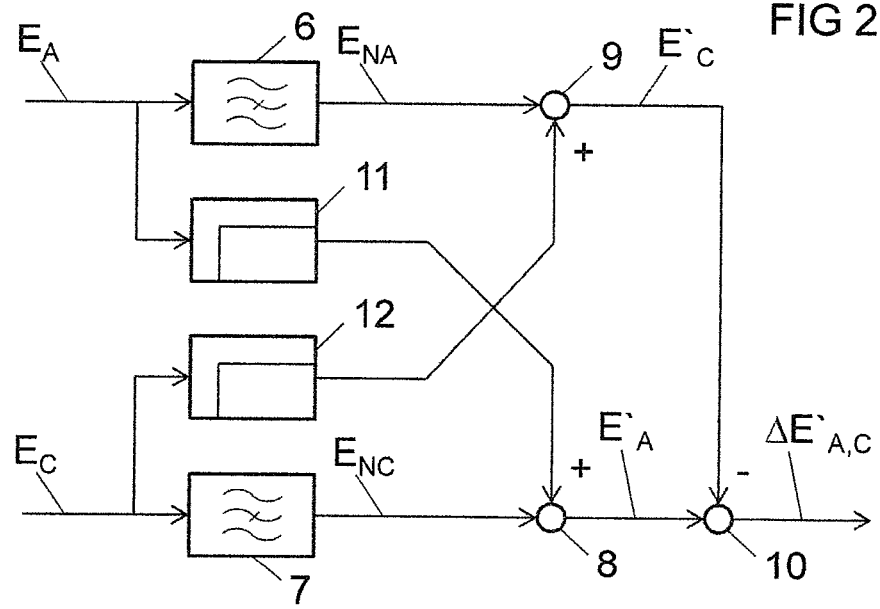
FIG. 2 is a schematic block diagram illustrating the signal processing in accordance with the invention.

With reference to FIG. 2, the advantageous way in which a measurement signal which, with improved insensitivity to noise, represents the induced voltage brought about by the flow of the medium more accurately than previously, can be obtained in the control and evaluation device 4, will be explained in greater detail below. A first electrical voltage signal $E_A$ is captured by the voltage between the electrode A (FIG. 1) and a reference potential being tapped off. In this case the potential tapped off at the reference electrode R (FIG. 1) preferably serves as the reference potential.

In a similar way, a second voltage signal $E_C$ is captured via the electrode C (FIG. 1), which is arranged on the opposite side of the measurement section D, and the reference electrode R. The first voltage signal $E_A$ and the second voltage signal $E_C$ can be each viewed as an overlaying of a useful signal $E_{SA}$ or $E_{SC}$ depending on the flow and a noise signal $E_{NA}$ or $E_{NC}$ uncorrelated thereto. The following relationship therefore applies:

$$E_A = E_{SA} + E_{NA} \text{ and}$$

$$E_C = E_{SC} + E_{NC}. \quad \text{Eq. 1}$$

The signal components caused by the electrochemical effects described above are filtered out of the first voltage signal $E_A$ and the second voltage signal $E_C$ with a notch filter 6 or 7 in each case, and in this way the first noise signal $E_{NA}$ and the second noise signal $E_{NC}$ obtained. The blocking frequency of the notch filter 6 and 7 is tuned to the frequency of the polarity change of the magnetic field B (FIG. 1). The first noise signal $E_{NA}$ and also the second noise signal $E_{NC}$ are thus freed from the signal components that stem from the flow. In summation, elements 8 and 9, the first voltage signal $E_A$ and the second noise signal $E_{NC}$ are summed to create a first sum signal $E'_A$ or the second voltage signal $E_C$ and the first noise signal $E_{NA}$ to create a second sum signal $E'_C$. The following relationships apply in this case:

$$E'_A = E_{SA} + E_{NA} + E_{NC} \text{ and}$$

$$E'_C = E_{SC} + E_{NC} + E_{NA}. \quad \text{Eq. 2}$$

To obtain a measurement signal $\Delta E'_{A,C}$, which corresponds to the voltage D induced over the measurement section, the first sum signal $E'_A$ and also the second sum signal $E'_C$ will be routed to a subtractor 10. The following relationship thus applies:

$$\Delta E'_{A,C} = E'_A - E'_C = (E_{SA} + E_{NA} + E_{NC}) - (E_{SC} + E_{NC} + E_{NA})$$
$$= E_{SA} - E_{SC}. \quad \text{Eq. 3}$$

Assuming ideal properties of the notch filters, in this way a measurement signal can be obtained that is ideally freed from noise components and merely represents the induced voltage brought about by the flow of the medium.

In the event of a delay of the signals being caused by the notch filters 6 and 7, suitable delay elements 11 or 12, which advantageously cause the same delay, can be inserted into the respective parallel signal paths for compensation.

Through the innovative signal processing, an electromagnetic flowmeter is thus obtained, with which a long-term elimination of the noise caused by electrochemical reactions can be guaranteed. This furthermore results in a more stable measurement signal with lower susceptibility to noise and an improved signal-to-noise ratio, as well as ultimately to a higher measurement accuracy of the flowmeter.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A magnetically inductive flowmeter, comprising:
   a measurement section through which a medium flows;
   a device for creating a magnetic field of alternating polarity;
   an electrode arrangement for capturing a voltage which is dependent on a flow speed of the medium and which is induced over the measurement section in a galvanically contacting manner; and
   a control and evaluation device for activating the device for creating the magnetic field creation and for determining and outputting a measurement value depending on the voltage captured;
   wherein the control and evaluation device is configured to capture a first voltage signal between a first electrode arranged on one side of the measurement section and a reference potential and filter the captured first voltage signal to obtain a first high-frequency noise signal contained therein;
   wherein the control and evaluation device is further configured to capture a second voltage signal between an electrode arranged on the opposite side of the measurement section and the reference potential and filter the captured second voltage signal to obtain a second high-frequency noise signal contained therein which differs from the first high frequency noise signal;
   wherein the first voltage signal and the second high-frequency noise signal are summed to create a first sum signal;
   wherein the second voltage signal and the first high-frequency noise signal are summed to create a second sum signal; and
   wherein a difference of the first sum signal and the second sum signal is formed to obtain a measurement signal which corresponds to a voltage induced over the measurement section.

2. The magnetically inductive flowmeter as claimed in claim 1, wherein the control and evaluation device is further configured to at least one of (i) monitor the first high frequency noise signal and (ii) monitor the second high frequency noise signal to determine diagnostic information that a predetermined threshold has been exceeded.

3. The magnetically inductive flowmeter as claimed in claim 2, wherein the electrode arrangement includes a reference potential electrode for capturing a reference potential.

4. The magnetically inductive flowmeter as claimed in claim 1, wherein the electrode arrangement includes a reference potential electrode for capturing a reference potential.

5. The magnetically inductive flowmeter as claimed in claim 1, wherein the control and evaluation device comprises at least one notch filter having a blocking frequency which is tuned to a frequency of the polarity change of the magnetic field to obtain the first high frequency noise signal and the second high frequency noise signal.

6. The magnetically inductive flowmeter as claimed in claim 1, wherein the control and evaluation device is further configured such that the first voltage signal, before being summed with the second high frequency noise signal, is delayed by a delay element to compensate for a signal delay arising during filtering of the first voltage signal and such that the second voltage signal, before being summed with the first high frequency noise signal is delayed by a delay element to compensate for a further signal delay arising during filtering of the second voltage signal.

* * * * *